D. L. CURTIS.
MONORAIL TRACTION SYSTEM.
APPLICATION FILED MAY 4, 1914.
1,112,599.
Patented Oct. 6, 1914.
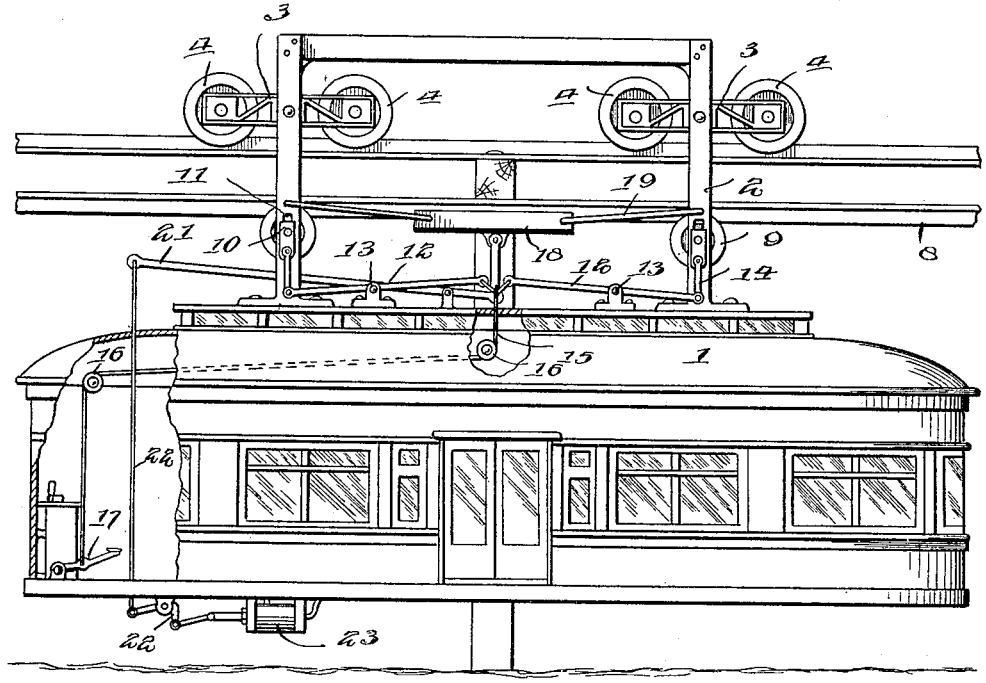
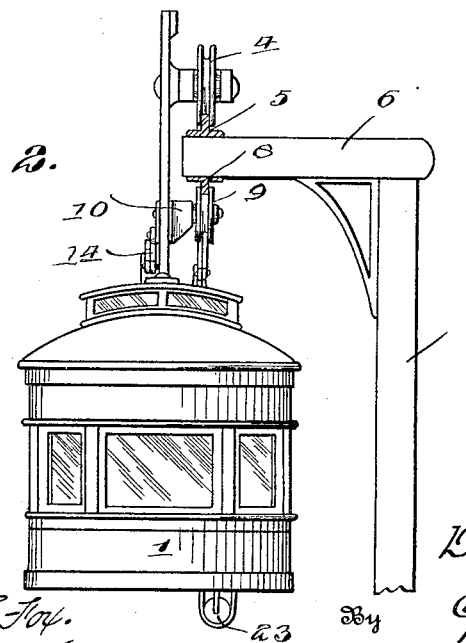
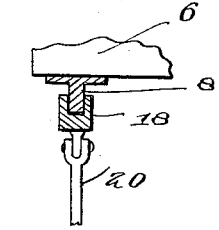
Witnesses
Frederick L. Fox.
Chas. J. Hagerty.
Inventor
David L. Curtis
By George J. Oltsch.
Attorney

UNITED STATES PATENT OFFICE.

DAVID L. CURTIS, OF SOUTH BEND, INDIANA.

MONORAIL TRACTION SYSTEM.

1,112,599.  Specification of Letters Patent.  Patented Oct. 6, 1914.

Application filed May 4, 1914. Serial No. 836,163.

*To all whom it may concern:*

Be it known that I, DAVID L. CURTIS, a citizen of the United States, residing at South Bend, in the county of St. Joseph and State of Indiana, have invented certain new and useful Improvements in Monorail Traction Systems, of which the following is a specification.

The invention relates to an improvement in monorail traction systems, comprehending more specifically the utilization of steadying means to prevent side swaying of the car, which steadying means are controlled by the motorman to permit their operation to vary the tractive force of the truck and drive wheels, whereby to permit practical operation of a comparatively light car on steep grades.

The essential feature of the invention resides in the production of steadying wheels coöperating with an independent trackway, the wheels being arranged for manual control so as to vary their pressure upon such trackway, thereby varying the tractive pressure of the main drive wheels.

A further feature of the invention resides in the production of a braking mechanism for coöperation with the auxiliary rail.

The invention in the preferred form of details will be set forth in the following specification, reference being had particularly to the accompanying drawings, in which:

Figure 1 is a side elevation illustrative of the invention. Fig. 2 is an end view of the same. Fig. 3 is a sectional detail illustrating the brake.

In the present invention I have shown conventionally a monorail system in which the car 1 is provided with an upstanding frame 2 to which near the upper end are connected trucks 3 carrying truck wheels 4 grooved or channeled for coöperation with the usual T-rail 5 supported on beams 6 carried on uprights 7, the whole constituting a conventional monorail system. One or both of the trucks may be electrically driven, as will be understood.

Secured to the underside of the beams 6 is an auxiliary T-rail 8, and the frame 2 is provided with wheels 9, grooved for coöperation with the rail 8, and serving to prevent side swaying of the car in travel.

As is well understood it has in monorail systems as heretofore devised been difficult, if not impossible, to drive light cars up steep grades, owing to the defective tractive power proportioned to the weight of the car. This has necessitated the use of comparatively heavy cars with a corresponding increase in operating expenses. The present invention is designed to avoid this, and to provide means whereby the tractive power of the guide wheels may be increased at the will of the motorman, insuring the effective operation of light cars. In carrying out this object the wheels 9 are mounted in bearings 10 adapted for sliding connection with the upright portions of the frame 2 through the medium of slots 11 formed therein. Levers 12 are pivotally mounted at 13 on the top of the car, the outer ends of said levers being connected by links 14 to the sliding bearing plates 10. The inner or adjacent ends of the levers are connected to a flexible cable 15, passed over guide rollers 16 within the car and terminally connected to a foot pedal 17 located adjacent the main controller.

By means of pressure upon the foot treadle the motorman may elevate the wheels 9 with respect to the frame 2 thereby in effect causing a greater traction between the drive wheels 4 and the main rail 5. This will permit of comparatively light cars being easily operated up steep grades, particularly as the increased traction may be relieved at will.

In conjunction with the adjustable tractive means described I contemplate the use of a brake including a shoe 18 channeled for coöperation with the rail 8 and swung from the frame 2, as by links 19. The shoe is connected to a link 20 with a lever 21 pivotally supported on top of the car, and said lever operated in any suitable manner. As illustrated, the lever is connected through rod and lever connections 22 with the brake cylinder 23 of an air brake system, though it is obvious that the lever 21 may be operated in any desired manner.

From the description of the braking detail it will be understood that movement of the outer end of the lever 21 in one direction will force the shoe into engagement with the rail 8, resulting in a braking action in accordance with the pressure applied.

From the above description it will be obvious that by my invention the driver or motorman may control the traction power of his drive wheels at will and may apply the brake whenever necessary.

What I claim as new is:

1. A monorail system including a main rail, an auxiliary rail, a car, a frame rising from the car, drive wheels carried by the frame and coöperating with the main rail, steadying wheels adjustably mounted in the frame and coöperating with the auxiliary rail, and means operable from the car for adjusting the steadying wheels.

2. A monorail system including a main rail, an auxiliary rail, a car, a frame rising from the car, drive wheels carried by the frame and coöperating with the main rail, steadying wheels adjustably mounted in the frame and coöperating with the auxiliary rail, levers connected to said steadying wheels, a foot pedal mounted on the car, and a connection intermediate said foot pedal and levers.

In testimony whereof I affix my signature in presence of two witnesses.

DAVID L. CURTIS.

Witnesses:
L. W. COOK,
GEORGE J. OLTSCH.

Copies of this patent may be obtained for five cents each, by addressing the "Commissioner of Patents, Washington, D. C."